(12) United States Patent
Sharman et al.

(10) Patent No.: US 11,284,105 B2
(45) Date of Patent: Mar. 22, 2022

(54) DATA ENCODING AND DECODING

(71) Applicant: SONY CORPORATION, Tokyo (JP)

(72) Inventors: Karl James Sharman, Newbury (GB); James Alexander Gamei, Kingston-Upon-Thames (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/102,122

(22) Filed: Nov. 23, 2020

(65) Prior Publication Data

US 2021/0105503 A1    Apr. 8, 2021

Related U.S. Application Data

(63) Continuation of application No. 15/127,815, filed as application No. PCT/GB2015/050927 on Mar. 27, 2015, now Pat. No. 10,873,759.

(30) Foreign Application Priority Data

Mar. 28, 2014 (GB) .................................... 1405649

(51) Int. Cl.
*H04N 19/55* (2014.01)
*H04N 19/70* (2014.01)
(Continued)

(52) U.S. Cl.
CPC ........... *H04N 19/55* (2014.11); *H04N 19/159* (2014.11); *H04N 19/523* (2014.11);
(Continued)

(58) Field of Classification Search
CPC ...... H04N 19/55; H04N 19/70; H04N 19/523; H04N 19/567; H04N 19/57; H04N 19/159
See application file for complete search history.

(56) References Cited

U.S. PATENT DOCUMENTS 10,873,759 B2 * 12/2020 Sharman ................ H04N 19/70
2006/0104357 A1 * 5/2006 Burazerovic ........ H04N 19/577
375/240.15
(Continued)

FOREIGN PATENT DOCUMENTS

CN       1750658 A    3/2006
CN     101547354 A    9/2009
(Continued)

OTHER PUBLICATIONS

Japanese Office Action dated Oct. 23, 2019 in Japanese Patent Application No. 2017-501518, 3 pages.
(Continued)

*Primary Examiner* — Tat C Chio
(74) *Attorney, Agent, or Firm* — Oblon, McClelland, Maier & Neustadt, L.L.P.

(57) ABSTRACT

A method encoding image data including: encoding the image data by an inter-image predictor in which a block of one or more samples of a current image is predicted from a reference block of samples located at one of a number of candidate block positions in a reference image; and selectively applying a constrained inter-image prediction mode in which, in comparison to an inter-image prediction mode for the encoding, one or both of the number of candidate block positions and the number of candidate reference images is reduced.

21 Claims, 7 Drawing Sheets

(51) Int. Cl.
*H04N 19/523* (2014.01)
*H04N 19/567* (2014.01)
*H04N 19/57* (2014.01)
*H04N 19/159* (2014.01)

(52) U.S. Cl.
CPC .......... *H04N 19/567* (2014.11); *H04N 19/57* (2014.11); *H04N 19/70* (2014.11)

(56) References Cited

U.S. PATENT DOCUMENTS

| | | | |
|---|---|---|---|
| 2007/0002948 A1 | 1/2007 | Shibahara et al. | |
| 2008/0075169 A1* | 3/2008 | Ugur | H04N 19/523 375/240.16 |
| 2009/0245374 A1 | 10/2009 | Hsu et al. | |
| 2012/0189062 A1* | 7/2012 | Sugio | H04N 19/132 375/240.16 |
| 2013/0308708 A1 | 11/2013 | Sugio et al. | |
| 2013/0343460 A1 | 12/2013 | Itani et al. | |
| 2014/0192885 A1* | 7/2014 | Seregin | H04N 19/52 375/240.16 |
| 2015/0156487 A1* | 6/2015 | Tao | H04N 19/577 375/240.02 |
| 2015/0181208 A1* | 6/2015 | Park | H04N 19/196 375/240.02 |

FOREIGN PATENT DOCUMENTS

| | | |
|---|---|---|
| EP | 2 680 588 A1 | 1/2014 |
| JP | 2004-328799 | 11/2004 |
| JP | 2005-057750 | 3/2005 |
| JP | 2006-270751 | 10/2006 |
| JP | 2007-503776 A | 2/2007 |
| JP | 2013-034152 | 2/2013 |
| JP | 2013-048476 | 3/2013 |
| WO | WO 2013/108691 | 7/2013 |

OTHER PUBLICATIONS

Zhou, Y., et al., "Motion Vector Resolution Control for Screen Content Coding", Microsoft Corp., Joint Collaborative Team on Video Coding (JCT-VC) of ITU-T SG 16 WP 3 and ISO/IEC JTC 1/SC 29/WG 11, Jan. 9-17, 2014, pp. 1-5 with cover pages.

Japanese Office Action dated Jan. 29, 2019, issued in Japanese Patent Application No. 2017-501518 (with English translation).

Office Action dated Sep. 29, 2018 in Chinese Application No. 2015800169277 (partial English translation only), 7 pgs.

International Search Report and Written Opinion dated Sep. 21, 2015 in PCT/GB2015/050927 filed Mar. 27, 2015.

Yi-Wen Chen, et al., "AHG13: DV constraint for inter-view data access," MediaTek Inc., Joint Collaborative Team on 3D Video Coding Extension Development of ITU-T SG 16 WP 3 and ISO/IEC JTC 1/SC 29/WG 11, JCT3V-C0129, Jan. 17-23, 2013, 4 pages.

* cited by examiner

|  | Average bit-rate increase | |
|---|---|---|
|  | AI | LB |
| Class F | -51.3% | 33.5% |
| Class B | -2.5% | 12.9% |
| RGB 4:4:4 SC | -83.4% | 57.1% |
| RGB 4:4:4 Animation | -3.7% | 33.6% |
| YCbCr 4:4:4 SC | -83.4% | 63.9% |
| YCbCr 4:4:4 Animation | -3.5% | 34.8% |
| RangeExt | -2.2% | 3.8% |
| RGB 4:4:4 SC (Optional) | -65.6% | 105.0% |
| YCbCr 4:4:4 SC (Optional) | -67.8% | 115.4% |
| Enc Time[%] | 160% | 52% |
| Dec Time[%] | 60% | 110% |

Table 1 - Bit rate change and coding times for constrained inter-prediction under AHG8 lossless intra and low delay test conditions (intra block-copy enabled)

FIG. 16

|  | Average bit-rate increase ||
|  | AI | LB |
| --- | --- | --- |
| Class F | -51.1% | 36.1% |
| Class B | -2.5% | 12.9% |
| RGB 4:4:4 SC | -81.5% | 99.8% |
| RGB 4:4:4 Animation | -3.6% | 33.7% |
| YCbCr 4:4:4 SC | -81.4% | 105.0% |
| YCbCr 4:4:4 Animation | -3.5% | 34.9% |
| RangeExt | -2.2% | 3.8% |
| RGB 4:4:4 SC (Optional) | -49.8% | 319.7% |
| YCbCr 4:4:4 SC (Optional) | -52.4% | 502.8% |
| Enc Time[%] | 136% | 44% |
| Dec Time[%] | 62% | 113% |

Table 2 - Bit rate change and coding times for constrained inter-prediction under AHG8 lossless intra and low delay test conditions (intra block-copy disabled)

FIG. 17

DATA ENCODING AND DECODING

CROSS REFERENCE TO RELATED APPLICATIONS

This application is a continuation of U.S. Ser. No. 15/127,815, filed Sep. 21, 2016, which is a National Stage of PCT/GB2015/050927, filed Mar. 27, 2015 and claims the benefit of the earlier filing date of GB1405649.3 filed in the United Kingdom Intellectual Property Office on Mar. 28, 2014. The entire content of the above-noted applications is incorporated herein by reference.

FIELD OF THE DISCLOSURE

This disclosure relates to data encoding and decoding.

DESCRIPTION OF THE RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

There are several video data compression and decompression systems which involve transforming video data into a frequency domain representation, quantising the frequency domain coefficients and then applying some form of entropy encoding to the quantised coefficients.

It is known that so-called "screen content" sequences (relating to image material not captured by a camera—for example, computer-generated image material) are characterised by sharp-edged features, typically interspersed with areas of perfectly flat sample values, which is to say, sample values having the same sample value across such an area. This is why tools such as intra block-copy are effective when coding these sequences.

However, these characteristics are present not only spatially within an image, but also temporally across multiple images. Screen content sequences are also characterised by substantial single-frame transitions, interspersed with long periods of identical frames.

For this reason, inter-predictive coding has been shown to achieve extremely high compression ratios for screen content sequences (hundreds-to-one in some example cases). However, inter-prediction presents a substantial cost in computational complexity for a codec (coder-decoder) implementation.

SUMMARY

This disclosure provides a data encoding method according to claim 1.

Further respective aspects and features are defined in the appended claims.

It is to be understood that both the foregoing general description and the following detailed description are exemplary, but not restrictive of, the present disclosure.

BRIEF DESCRIPTION OF THE DRAWINGS

A more complete appreciation of the disclosure and many of the attendant advantages thereof will be readily obtained as the same becomes better understood by reference to the following detailed description of embodiments, when considered in connection with the accompanying drawings, wherein:

FIG. 16 is a table (Table 1) showing results of empirical tests carried out in respect of so-called AHG8 lossless test conditions, with intra-block-copy being enabled.

FIG. 17 is a table (Table 2) showing results of empirical tests carried out in respect of so-called AHG8 lossless test conditions, with intra-block-copy being disabled.

DESCRIPTION OF THE EMBODIMENTS

Figure 1:
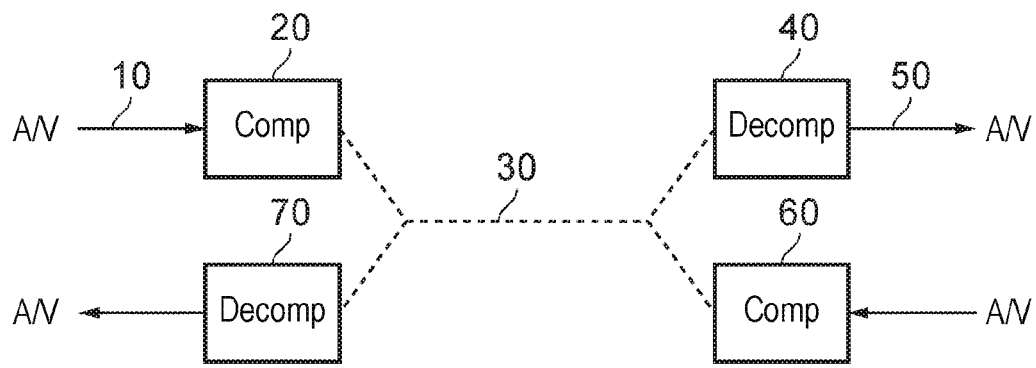
FIG. 1 schematically illustrates an audio/video (A/V) data transmission and reception system using video data compression and decompression.

Referring now to the drawings, FIGS. 1-4 are provided to give schematic illustrations of apparatus or systems making use of the compression and/or decompression apparatus to be described below in connection with embodiments.

All of the data compression and/or decompression apparatus is to be described below may be implemented in hardware, in software running on a general-purpose data processing apparatus such as a general-purpose computer, as programmable hardware such as an application specific integrated circuit (ASIC) or field programmable gate array (FPGA) or as combinations of these. In cases where the embodiments are implemented by software and/or firmware, it will be appreciated that such software and/or firmware, and non-transitory machine-readable data storage media by which such software and/or firmware are stored or otherwise provided, are considered as embodiments.

FIG. 1 schematically illustrates an audio/video data transmission and reception system using video data compression and decompression.

An input audio/video signal 10 is supplied to a video data compression apparatus 20 which compresses at least the video component of the audio/video signal 10 for transmission along a transmission route 30 such as a cable, an optical fibre, a wireless link or the like. The compressed signal is processed by a decompression apparatus 40 to provide an output audio/video signal 50. For the return path, a compression apparatus 60 compresses an audio/video signal for transmission along the transmission route 30 to a decompression apparatus 70.

The compression apparatus 20 and decompression apparatus 70 can therefore form one node of a transmission link. The decompression apparatus 40 and decompression apparatus 60 can form another node of the transmission link. Of course, in instances where the transmission link is unidirectional, only one of the nodes would require a compression apparatus and the other node would only require a decompression apparatus.

Figure 2:
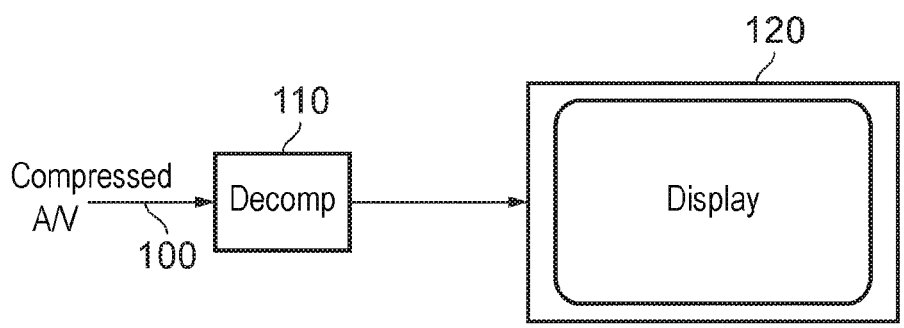
FIG. 2 schematically illustrates a video display system using video data decompression.

FIG. 2 schematically illustrates a video display system using video data decompression. In particular, a compressed audio/video signal 100 is processed by a decompression apparatus 110 to provide a decompressed signal which can be displayed on a display 120. The decompression apparatus 110 could be implemented as an integral part of the display 120, for example being provided within the same casing as the display device. Alternatively, the decompression apparatus 110 might be provided as (for example) a so-called set top box (STB), noting that the expression "set-top" does not imply a requirement for the box to be sited in any particular orientation or position with respect to the display 120; it is simply a term used in the art to indicate a device which is connectable to a display as a peripheral device.

Figure 3:
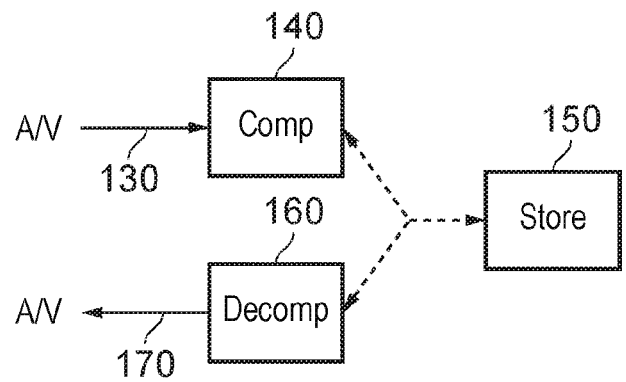
FIG. 3 schematically illustrates an audio/video storage system using video data compression and decompression.

FIG. 3 schematically illustrates an audio/video storage system using video data compression and decompression. An input audio/video signal 130 is supplied to a compression apparatus 140 which generates a compressed signal for storing by a store device 150 such as a magnetic disk device, an optical disk device, a magnetic tape device, a solid state storage device such as a semiconductor memory or other storage device. For replay, compressed data is read from the store device 150 and passed to a decompression apparatus 160 for decompression to provide an output audio/video signal 170.

It will be appreciated that the compressed or encoded signal, and a storage medium or data carrier storing that signal, are considered as embodiments. In particular, embodiments of the disclosure include an instance of distribution of encoded data which is partitioned into data portions, the encoded data comprising a flag indicating a constrained inter-image prediction mode in which, in comparison to the inter-image prediction mode, one or both of the number of candidate block positions and the number of candidate reference images is reduced.

Figure 4:
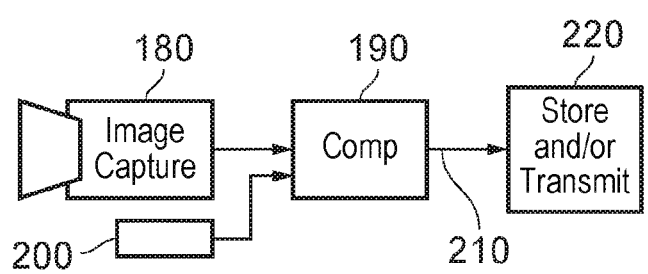
FIG. 4 schematically illustrates a video camera using video data compression.

FIG. 4 schematically illustrates a video camera using video data compression. In FIG. 4, and image capture device 180, such as a charge coupled device (CCD) image sensor and associated control and read-out electronics, generates a video signal which is passed to a compression apparatus 190. A microphone (or plural microphones) 200 generates an audio signal to be passed to the compression apparatus 190. The compression apparatus 190 generates a compressed audio/video signal 210 to be stored and/or transmitted (shown generically as a schematic stage 220).

The techniques to be described below relate primarily to video data compression. It will be appreciated that many existing techniques may be used for audio data compression in conjunction with the video data compression techniques which will be described, to generate a compressed audio/video signal. Accordingly, a separate discussion of audio data compression will not be provided. It will also be appreciated that the data rate associated with video data, in particular broadcast quality video data, is generally very much higher than the data rate associated with audio data (whether compressed or uncompressed). It will therefore be appreciated that uncompressed audio data could accompany compressed video data to form a compressed audio/video signal. It will further be appreciated that although the present examples (shown in FIGS. 1-4) relate to audio/video data, the techniques to be described below can find use in a system which simply deals with (that is to say, compresses, decompresses, stores, displays and/or transmits) video data. That is to say, the embodiments can apply to video data compression without necessarily having any associated audio data handling at all.

Figure 5:
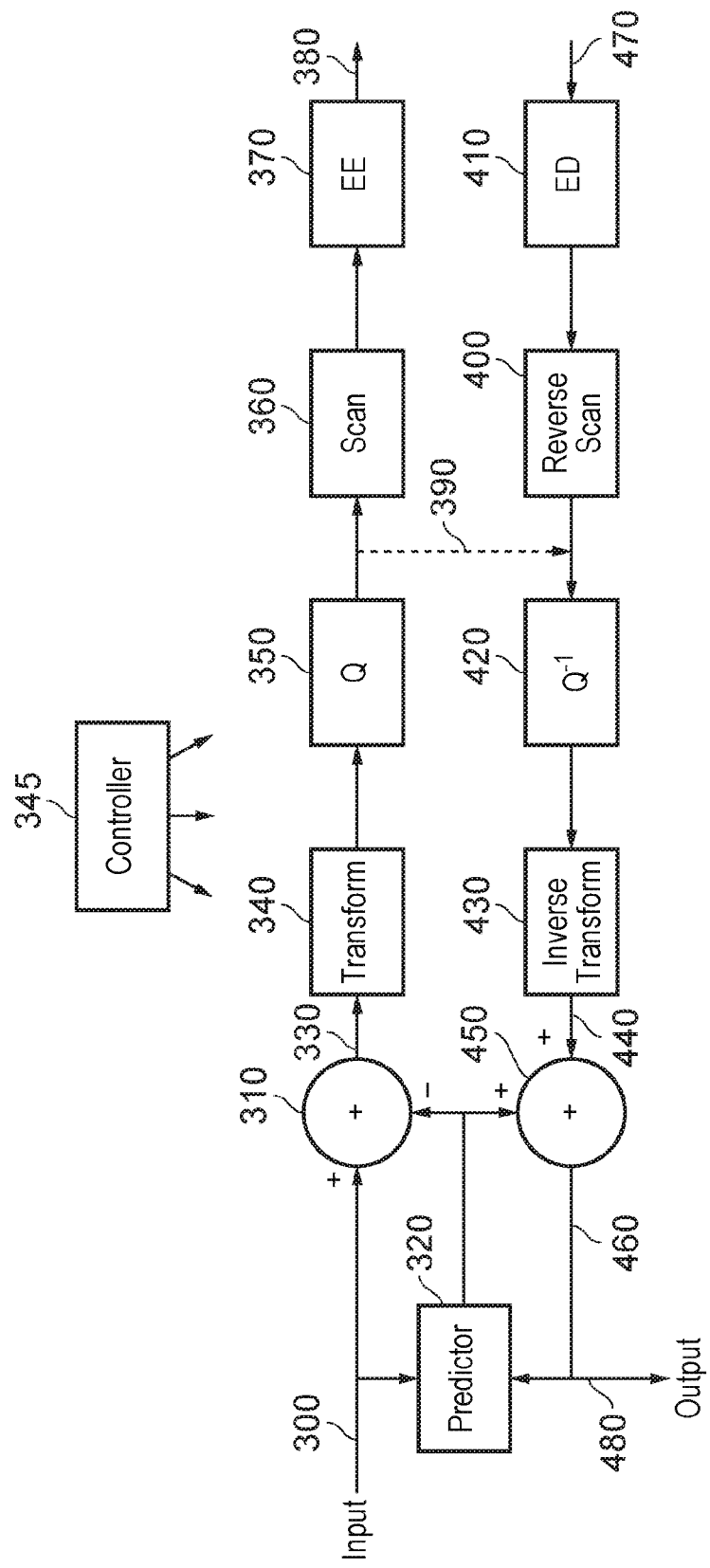
FIG. 5 provides a schematic overview of a video data compression and decompression apparatus.

FIG. 5 provides a schematic overview of a video data compression and decompression apparatus. The apparatus operates under the control of a controller 345.

Successive images of an input video signal 300 are supplied to an adder 310 and to an image predictor 320. The image predictor 320 will be described below in more detail with reference to FIG. 6. The adder 310 in fact performs a subtraction (negative addition) operation, in that it receives the input video signal 300 on a "+" input and the output of the image predictor 320 on a "−" input, so that the predicted image is subtracted from the input image. The result is to generate a so-called residual image signal 330 representing the difference between the actual and projected images.

One reason why a residual image signal is generated is as follows. The data coding techniques to be described, that is to say the techniques which will be applied to the residual image signal, tends to work more efficiently when there is less "energy" in the image to be encoded. Here, the term "efficiently" refers to the generation of a small amount of encoded data; for a particular image quality level, it is desirable (and considered "efficient") to generate as little data as is practicably possible. The reference to "energy" in the residual image relates to the amount of information contained in the residual image. If the predicted image were to be identical to the real image, the difference between the two (that is to say, the residual image) would contain zero information (zero energy) and would be very easy to encode into a small amount of encoded data. In general, if the prediction process can be made to work reasonably well, the expectation is that the residual image data will contain less information (less energy) than the input image and so will be easier to encode into a small amount of encoded data.

The residual image data 330 is supplied to a transform unit 340 which generates a discrete cosine transform (DCT) representation of the residual image data. The DCT technique itself is well known and will not be described in detail here. There are however aspects of the techniques used in the present apparatus which will be described in more detail below, in particular relating to the selection of different blocks of data to which the DCT operation is applied.

Note that in some embodiments, a discrete sine transform (DST) is used instead of a DCT. In other embodiments, no transform might be used. This can be done selectively, so that the transform stage is, in effect, bypassed, for example under the control of a "transform skip" command or mode.

The output of the transform unit 340, which is to say, a set of transform coefficients for each transformed block of image data, is supplied to a quantiser 350. Various quantisation techniques are known in the field of video data compression, ranging from a simple multiplication by a quantisation scaling factor through to the application of complicated lookup tables under the control of a quantisation parameter. The general aim is twofold. Firstly, the quantisation process reduces the number of possible values of the transformed data. Secondly, the quantisation process can increase the likelihood that values of the transformed data are zero. Both of these can make the entropy encoding process work more efficiently in generating small amounts of compressed video data.

A data scanning process is applied by a scan unit 360. The purpose of the scanning process is to reorder the quantised transformed data so as to gather as many as possible of the non-zero quantised transformed coefficients together, and of course therefore to gather as many as possible of the zero-valued coefficients together. These features can allow so-called run-length coding or similar techniques to be applied efficiently. So, the scanning process involves selecting coefficients from the quantised transformed data, and in particular from a block of coefficients corresponding to a block of image data which has been transformed and quantised, according to a "scanning order" so that (a) all of the coefficients are selected once as part of the scan, and (b) the scan tends to provide the desired reordering. One example scanning order which can tend to give useful results is a so-called zigzag scanning order.

The scanned coefficients are then passed to an entropy encoder (EE) 370. Again, various types of entropy encoding may be used. Two examples are variants of the so-called CABAC (Context Adaptive Binary Arithmetic Coding) system and variants of the so-called CAVLC (Context Adaptive Variable-Length Coding) system. In general terms, CABAC is considered to provide a better efficiency, and in some studies has been shown to provide a 10-20% reduction in the quantity of encoded output data for a comparable image quality compared to CAVLC. However, CAVLC is considered to represent a much lower level of complexity (in terms of its implementation) than CABAC.

Note that the scanning process and the entropy encoding process are shown as separate processes, but in fact can be combined or treated together. That is to say, the reading of data into the entropy encoder can take place in the scan order. Corresponding considerations apply to the respective inverse processes.

The output of the entropy encoder 370, along with additional data (mentioned above and/or discussed below), for example defining the manner in which the predictor 320 generated the predicted image, provides a compressed output video signal 380.

However, a return path is also provided because the operation of the predictor 320 itself depends upon a decompressed version of the compressed output data.

The reason for this feature is as follows. At the appropriate stage in the decompression process a decompressed version of the residual data is generated. This decompressed residual data has to be added to a predicted image to generate an output image (because the original residual data was the difference between the input image and a predicted image). In order that this process is comparable, as between the compression side and the decompression side, the predicted images generated by the predictor 320 should be the same during the compression process and during the decompression process. Of course, at decompression, the apparatus does not have access to the original input images, but only to the decompressed images. Therefore, at compression, the predictor 320 bases its prediction (at least, for inter-image encoding) on decompressed versions of the compressed images.

The entropy encoding process carried out by the entropy encoder 370 is considered to be "lossless", which is to say that it can be reversed to arrive at exactly the same data which was first supplied to the entropy encoder 370. So, the return path can be implemented before the entropy encoding stage. Indeed, the scanning process carried out by the scan unit 360 is also considered lossless, but in the present embodiment the return path 390 is from the output of the quantiser 350 to the input of a complimentary inverse quantiser 420.

In general terms, an entropy decoder 410, the reverse scan unit 400, an inverse quantiser 420 and an inverse transform unit 430 provide the respective inverse functions of the entropy encoder 370, the scan unit 360, the quantiser 350 and the transform unit 340. For now, the discussion will continue through the compression process; the process to decompress an input compressed video signal will be discussed separately below.

In the compression process, the scanned coefficients are passed by the return path 390 from the quantiser 350 to the inverse quantiser 420 which carries out the inverse operation of the scan unit 360. An inverse quantisation and inverse transformation process are carried out by the units 420, 430 to generate a compressed-decompressed residual image signal 440.

The image signal 440 is added, at an adder 450, to the output of the predictor 320 to generate a reconstructed output image 460. This forms one input to the image predictor 320, as will be described below.

Turning now to the process applied to a received compressed video signal 470, the signal is supplied to the entropy decoder 410 and from there to the chain of the reverse scan unit 400, the inverse quantiser 420 and the inverse transform unit 430 before being added to the output of the image predictor 320 by the adder 450. In straightforward terms, the output 460 of the adder 450 forms the output decompressed video signal 480. In practice, further filtering may be applied before the signal is output. Accordingly, the processing applied to the received compressed video signal 470 corresponds to the operation of a decoder.

Figure 6:
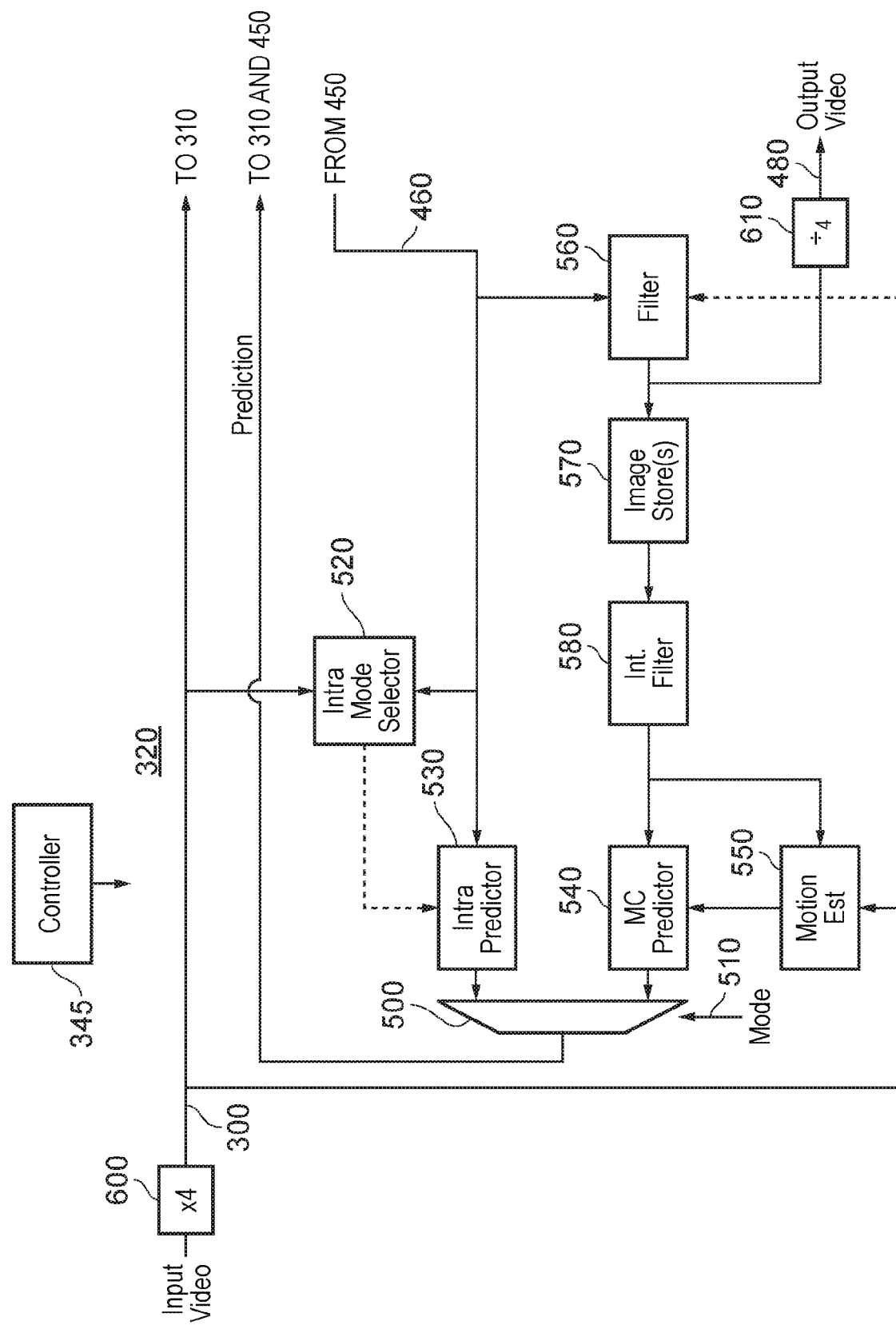
FIG. 6 schematically illustrates the generation of predicted images; if

FIG. 6 schematically illustrates the generation of predicted images, and in particular the operation of the image predictor 320.

There are three basic modes of prediction: two of these are so-called intra-image prediction and so-called inter-image, or motion-compensated (MC), prediction. A third is in some respects a hybrid of the two: an intra-block-copy mode uses other blocks as predictions of current blocks, but those other blocks are derived from the same image as the current blocks.

The same image prediction technique is used across the whole of a prediction unit (PU) which is a sub-block of an image. Different prediction techniques may be used from PU to PU. The prediction technique for a PU, and indeed the manner by which the image is split into PUs, may be selected by the controller 345, for example on the basis of trial or test predictions of some or all of an image, to see which technique provides an appropriate (or for example, the best) balance of "cost" (in terms of data quantity generated) against performance (for example, signal to noise ratio of the compressed and decompressed image) within a required set of parameters.

Intra-image prediction bases a prediction of the content of a block of the image on nearby data from within the same image. This corresponds to so-called I-frame encoding in other video compression techniques. In contrast to I-frame encoding, where the whole image is intra-encoded, in the present embodiments the choice between intra- and inter-encoding can be made on a block-by-block basis, though in other embodiments the choice is still made on an image-by-image basis.

Motion-compensated prediction makes use of motion information which attempts to define the source, in another adjacent or nearby image, of image detail to be encoded in the current image. Accordingly, in an ideal example, the contents of a block of image data in the predicted image can be encoded very simply as a reference (a motion vector) pointing to a corresponding block at the same or a slightly different position in an adjacent image.

Returning to FIG. 6, two image prediction arrangements (corresponding to intra- and inter-image prediction) are shown, the results of which are selected by a multiplexer 500 under the control of a mode signal 510 so as to provide blocks of the predicted image for supply to the adders 310 and 450. The choice is made in dependence upon which selection gives the lowest "energy" (which, as discussed above, may be considered as information content requiring encoding), and the choice is signalled to the encoder within the encoded output data stream. Image energy, in this context, can be detected, for example, by carrying out a trial subtraction of an area of the two versions of the predicted image from the input image, squaring each pixel value of the difference image, summing the squared values, and identifying which of the two versions gives rise to the lower mean squared value of the difference image relating to that image area.

In some examples, a third prediction arrangement to provide intra-block-copy prediction can be used. However, in the present embodiments, intra-block-copy prediction is implemented by the same arrangement as the inter-image prediction, by simply basing the prediction and the generation of motion vectors on the same (rather than another) image.

The actual prediction, in the intra-encoding system, is made on the basis of image blocks received as part of the signal 460, which is to say, the prediction is based upon encoded-decoded image blocks in order that exactly the same prediction can be made at a decompression apparatus. However, data can be derived from the input video signal 300 by an intra-mode selector 520 to control the operation of the intra-image predictor 530.

For inter-image prediction and intra-block-copy prediction, a motion compensated (MC) predictor 540 uses motion information such as motion vectors derived by a motion estimator 550 from the input video signal 300. Those motion vectors are applied to a processed version of the reconstructed image 460 by the motion compensated predictor 540 to generate blocks of the inter-image or intra-block-copy prediction.

The processing applied to the signal 460 will now be described. Firstly, the signal is filtered by a filter unit 560. This involves applying a "deblocking" filter to remove or at least tend to reduce the effects of the block-based processing carried out by the transform unit 340 and subsequent operations. Also, an adaptive loop filter is applied using coefficients derived by processing the reconstructed signal 460 and the input video signal 300. The adaptive loop filter is a type of filter which, using known techniques, applies adaptive filter coefficients to the data to be filtered. That is to say, the filter coefficients can vary in dependence upon various factors. Data defining which filter coefficients to use is included as part of the encoded output data stream.

The filtered output from the filter unit 560 in fact forms the output video signal 480. It is also buffered in one or more image stores 570; the storage of successive images is a requirement of motion compensated prediction processing, and in particular the generation of motion vectors. To save on storage requirements, the stored images in the image stores 570 may be held in a compressed form and then decompressed for use in generating motion vectors. For this particular purpose, any known compression/decompression system may be used. The stored images are passed to an interpolation filter 580 which generates a higher resolution version of the stored images; in this example, intermediate samples (sub-samples) are generated such that the resolution of the interpolated image is output by the interpolation filter 580 is 8 times (in each dimension) that of the images stored in the image stores 570. The interpolated images are passed as an input to the motion estimator 550 and also to the motion compensated predictor 540.

In embodiments, a further optional stage is provided, which is to multiply the data values of the input video signal by a factor of four using a multiplier 600 (effectively just shifting the data values left by two bits), and to apply a corresponding divide operation (shift right by two bits) at the output of the apparatus using a divider or right-shifter 610. So, the shifting left and shifting right changes the data purely for the internal operation of the apparatus. This measure can provide for higher calculation accuracy within the apparatus, as the effect of any data rounding errors is reduced.

Inter-image coding has been shown to achieve extremely high compression ratios for screen content sequences (hundreds-to-one in some example cases). However, inter-prediction presents a substantial cost in computational complexity for a codec (coder-decoder) implementation.

Note that the term "screen content sequences" relates to sequences of successive images which contain screen content (image material not captured by a camera). The term does not imply that the whole of each image is formed of screen content, though of course this could be the situation (as a specific example of the more general meaning of the term). In the case of images A simpler "constrained" version of inter-prediction may be able to achieve similar compression performance without a large complexity increase over an all-intra codec.

Example arrangements will be discussed below. However, in general terms, such a constraint could comprise a limit on the motion vector length (to within a smaller area) or even a restriction of the length to the single value of 0, or a reduction in the prediction accuracy (half-luma-sample or integer sample only instead of quarter-luma-sample), or a limit on the number of reference frames that may be used, or a combination of these and/or other constraints Considering that many frames (or regions of frames) in screen content will be exactly the same as their preceding frames, it is posited that most if not all of the benefit available through inter-predictive coding can be obtained using a constrained inter prediction mode where the motion vector and reference index are fixed at the value 0 for all inter-coded PUs.

Such a mode would be significantly simpler to implement than full inter-prediction as no interpolation or buffering of more than one frame is required. In addition, no motion vector search is needed in the encoder.

The syntax and tools required to implement this mode are already present in HEVC Range Extensions. In embodiments, a single flag in (forming part of) the sequence parameter set extension would be needed. This tool may be enabled either in the intra-only profiles or in new "extended intra" profiles (as there is no implementation benefit to a decoder that already supports full inter-prediction).

Specific example arrangements will now be described.

Figure 7:
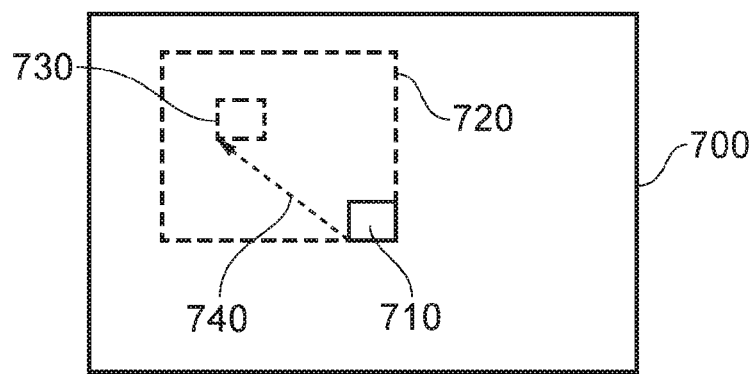
FIG. 7 schematically illustrates an intra-block-copy process.

FIG. 7 schematically illustrates an intra-block-copy process, which, as mentioned above, provides one technique suitable for encoding screen content sequences.

Within a particular image 700, in respect of a block 710 for which an intra-block-copy prediction is to be carried out, the most similar correspondingly-sized block within a search area 720 is identified by detecting correlation (for example, a sum of absolute differences between the block 710 and each candidate block position within the search area 720. When a most-similar block 730 has been identified, the displacement 740 between the block 710 and the most-similar block 720 forms the motion vector associated with the block 710. Note that the block 710 can be, for example, a rectangular array of n×m samples, where n and m are integers equal to 1 or more.

Figure 8:
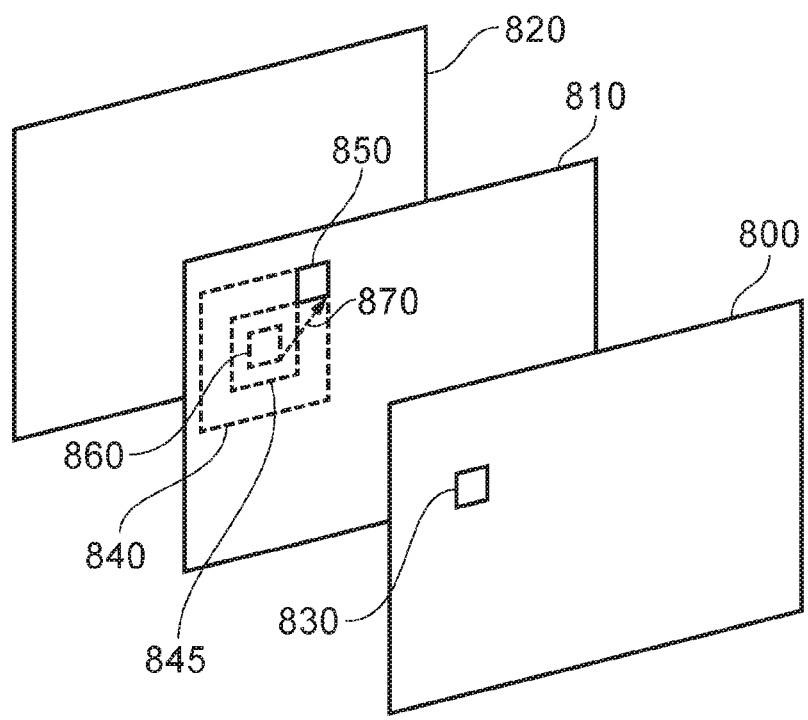
FIG. 8 schematically illustrates an inter-image prediction process.

FIG. 8 schematically illustrates an inter-image prediction process. As noted above, this arrangement is particularly suitable for screen content sequences comprising multiple successive images. It will, however, be described now in more general terms.

In respect of a current image 800, one or more reference images 810, 820 . . . are selected by the controller 345. The process in respect of a single one of the reference images, and image 810, will be described for clarity of the description, but it will be appreciated that the process can take place in respect of more than one reference image with the best result being selected at the end of the process.

For a current test block 830 of n×m samples in the image 800, the most-similar block 850 within a search area 840 in the reference image 810 is detected, for example using the techniques discussed above in relation to FIG. 7. The displacement 870 between the position of the most-similar block 850 and the position 860 in the image 810 corresponding to the position of the block 830 in the image 800 represents the motion vector associated with the block 830. Note that in some situations, a current block 830 may be predicted using a weighted combination of blocks such as the block 850 in multiple ones of the reference images 810, 820. In general, the information required for the prediction of the block 830 comprises one or more motion vectors and, unless this information is implicit or predetermined, the identity of one or more reference images. In some examples, a so-called reference index is used such that a reference index of zero specifies the immediately temporally preceding image (the image 810 in the example of FIG. 8). In embodiments the reference index of zero specifies the image at the head of a reference list. In embodiments there is only one image in the reference list.

The process shown in respect of FIG. 8 represents a "normal" or "unconstrained" inter prediction operation. Techniques by which the process can be constrained, for example in order to reduce the processing overhead associated with the process, will be discussed below.

Figure 9:
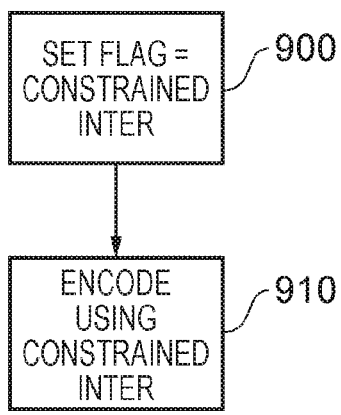
FIG. 9 is a schematic flowchart illustrating the use of a flag at the encoder side.

FIG. 9 is a schematic flowchart illustrating the use of a flag at the encoder side. In some situations, a flag may be used to indicate that a constrained inter-image prediction mode has been employed. Note that in other situations, such a flag may not be needed. Examples will be discussed below.

At a step 900, the controller 345 sets a flag in the encoder bitstream to indicate that a constrained inter-image prediction mode is to be used. For example, the flag may be implemented as part of the so-called sequence parameter set, for example as sequence parameter set extension data. At a step 910, the encoder encodes images subsequent to the setting of the flag using the constrained inter-image mode.

The process of FIG. 9 provides an example of a method of operation of an image data encoding apparatus having an inter-image prediction mode in which a block of one or more samples of a current image is predicted from a reference block of samples located at one of a number of candidate block positions in a reference image, the method comprising: selectively applying a constrained inter-image prediction mode in which, in comparison to the inter-image prediction mode, one or both of the number of candidate block positions and the number of candidate reference images is reduced. In embodiments, the reference block is detected by comparing the block of the current image with multiple candidate block positions in a search area of one or more candidate reference images.

Figure 10:
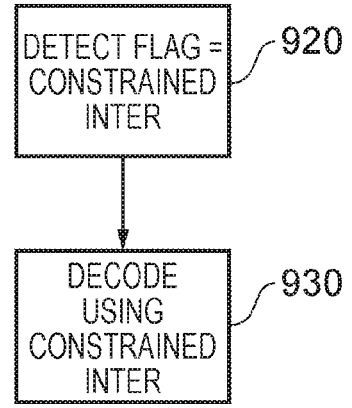
FIG. 10 is a schematic flowchart illustrating the use of a flag at the decoder side.

FIG. 10 is a schematic flowchart illustrating the use of a flag at the decoder side. Note that a flag may not be necessary to the decoder, depending on the nature of the constraint and the processing capabilities of the decoder. However, in situations where a flag is relevant to the decoder, then at a step 920, the controller (corresponding to the controller 345) of the decoder detects that the flag is set to indicate a constrained inter-image prediction mode and, at a step 930 the decoder decodes the bitstream using the constrained inter-image prediction mode.

The process of FIG. 10 provides an example of a method of operation of an image data decoding apparatus having an inter-image prediction mode in which a block of one or more samples of a current image is predicted from a reference block of samples located at one of a number of candidate block positions in a reference image, the method comprising: selectively applying a constrained inter-image prediction mode in which, in comparison to the inter-image prediction mode, one or both of the number of candidate block positions and the number of candidate reference images is reduced. In embodiments, the reference block is detected by comparing the block of the current image with multiple candidate block positions in a search area of one or more candidate reference images.

Figure 11:
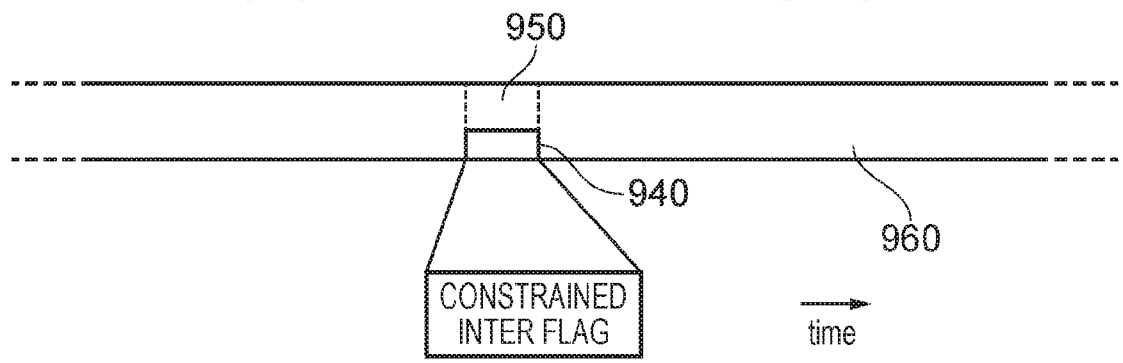
FIG. 11 schematically illustrates a constrained inter flag.

FIG. 11 schematically illustrates a constrained inter flag 940 forming, for example, part of the sequence parameter set 950 of an encoded data stream 960. The temporal sense of FIG. 11 is such that images encoded subsequent to the setting of the flag 940 are represented by portions of the bitstream 960 drawn to the right of the schematic representation of the flag 940. As discussed above, such images are encoded using the constrained inter-image prediction mode corresponding to the set flag 940.

This therefore provides an example of setting a flag, in a data stream of encoded image data, to indicate that the constrained inter-image prediction mode is applied. The flag may form part of sequence parameter set data.

FIGS. 12-15 are schematic flowchart illustrating example techniques relating to a constrained inter-image encoding process.

Figures 12, 13, 14, 15:
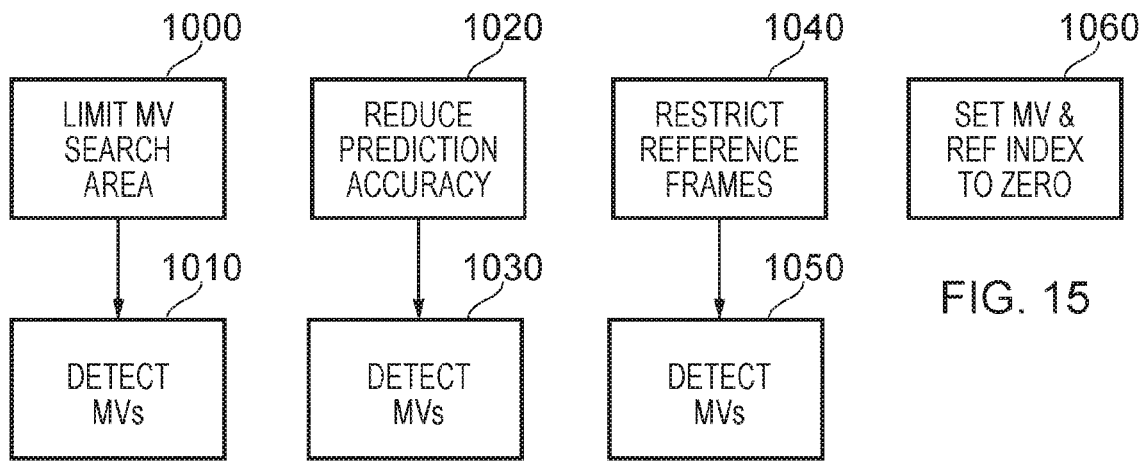
FIGS. 12-15 are schematic flowchart illustrating example techniques relating to a constrained inter-image encoding process.

In FIG. 12, at a step 1000 the controller 345 limits the motion vector search area 840 to a smaller area 845 (FIG. 8), which in at least some embodiments still encompasses the position 860 corresponding to the position of the block 830 under consideration. By limiting the motion vector search area, the processing requirements for carrying out the search are reduced. At a step 1010 the motion estimator 550 detects motion vectors according to the reduced search area. Accordingly, in the constrained inter-image prediction mode, a search area of the reference image comprising the candidate positions of the reference block is smaller than a search area in the inter-image prediction mode.

In FIG. 13, at a step 1020 the controller 345 reduces the prediction accuracy, for example by disabling the use of the interpolation filter 580 so that instead of, for example, a quarter sample accuracy, a half sample or integer sample accuracy is used in the inter-image prediction process. Again, this reduces the processing requirements for carrying out the process. At a step 1030 the motion estimator 550 detects motion vectors according to the reduced accuracy.

Accordingly, in the constrained inter-image prediction mode, the location in the reference image of the reference block is detected to a lower precision than in the inter-image prediction mode.

In FIG. 14, the selection of reference images 810, 820 . . . is restricted compared to a normal inter-image prediction operation. Because fewer images are used in the production process, either as part of the ultimate generation of the predicted block or in order to detect which of the candidate reference images provides the best result, the processing requirements for carrying out the process are reduced. At a step 1050 the motion estimator 550 detects motion vectors according to the restricted set of reference images. Accordingly, in the constrained inter-image prediction mode, the number of candidate reference images for use with a current image is smaller than the number of candidate reference images in the inter-image prediction mode.

Note that any of the techniques discussed with reference to FIGS. 12-15 may be combined.

FIG. 15 represents a special case of the arrangements of FIGS. 12 and 14, in that the motion vector is constrained to a displacement of zero, so that inter-image prediction is carried out using the block at the corresponding position 860 in the reference image. Also, the reference index is constrained to a value of zero, indicating that the immediately temporally preceding image is defined as the reference image. In this instance, no searching is required at all. If the inter-image prediction mode is selected under these constraints, then without requiring any searching the motion vector and reference index are known straightaway. Note that the two parts of FIG. 15 (the setting of the motion vector to zero and the setting of the reference index to zero) may be carried out together or separately. In embodiments, in the constrained inter-image prediction mode, the position of the reference block in the reference image is identical to the position of the block in the current image. In embodiments, in the constrained inter-image prediction mode, the number of candidate reference images for a current image is equal to one. The candidate reference image may be an immediately temporally preceding image.

Empirical tests have been carried out in respect of so-called AHG8 lossless test conditions, with and without intra-block-copy being enabled. The results are presented in Table 1 and Table 2 respectively, as shown in FIGS. 16 and 17.

The AGHS8 Lossless test conditions are defined in document P1006 "Common Test Conditions and Software Reference Configurations for HEVC Range Extensions", Version 1 of 24 Jan. 2014 and Version 2 of 5 Feb. 2014.

As the results show, the bit rate for this scheme is no more than double the bit rate for full inter-coding while being as little as 20% of the bit rate for all-intra. It is observed that, for screen content sequences, this scheme delivers almost the full benefit of inter-coding with a substantial reduction in complexity.

In summary, an extension to intra coding has been presented that allows a simplified form of inter-prediction to be used in sequences that have very high temporal correlation. This scheme has been shown to confer a substantial decrease in bit rate (over 80%) for screen content when compared to all-intra coding.

Respective aspects and features of embodiments of the disclosure are defined by the following numbered clauses:

1. A method of operation of an image data encoding apparatus having an inter-image prediction mode in which a block of one or more samples of a current image is predicted from a reference block of samples located at one of a number of candidate block positions in a reference image, the method comprising:

selectively applying a constrained inter-image prediction mode in which, in comparison to the inter-image prediction mode, one or both of the number of candidate block positions and the number of candidate reference images is reduced.

2. A method according to clause 1, comprising the step of setting a flag, in a data stream of encoded image data, to indicate that the constrained inter-image prediction mode is applied.

3. A method according to clause 2, in which the flag forms part of sequence parameter set data.

4. A method according to any one of the preceding clauses in which, in the constrained inter-image prediction mode, the location in the reference image of the reference block is detected to a lower precision than in the inter-image prediction mode.

5. A method according to any one of the preceding clauses in which, in the constrained inter-image prediction mode, a search area of the reference image comprising the candidate positions of the reference block is smaller than a search area in the inter-image prediction mode.

6. A method according to any one of the preceding clauses in which, in the constrained inter-image prediction mode, the number of candidate reference images for use with a current image is smaller than the number of candidate reference images in the inter-image prediction mode.

7. A method according to any one of the preceding clauses in which, in the constrained inter-image prediction mode, the position of the reference block in the reference image is identical to the position of the block in the current image.

8. A method according to any one of the preceding clauses in which, in the constrained inter-image prediction mode, the number of candidate reference images for a current image is equal to one.

9. A method according to clause 8, in which the candidate reference image is an immediately temporally preceding image.

10. A method of operation of an image data decoding apparatus having an inter-image prediction mode in which a block of one or more samples of a current image is predicted from a reference block of samples located at one of a number of candidate block positions in a reference image, the method comprising:

selectively applying a constrained inter-image prediction mode in which, in comparison to the inter-image prediction mode, one or both of the number of candidate block positions and the number of candidate reference images is reduced.

11. A method according to any one of the preceding claims, comprising:

detecting the reference block by comparing the block of the current image with multiple candidate block positions in a search area of one or more candidate reference images.

12. Computer software which, when executed by a computer, causes the computer to carry out the method of any one of the preceding clauses.

13. A non-transitory, machine-readable storage medium which stores computer software according to clause 12.

14. A data encoding apparatus having an inter-image prediction mode in which a block of one or more samples of a current image is predicted from a reference block of samples located at one of a number of candidate block positions in a reference image, the apparatus comprising:

a controller configured to selectively apply a constrained inter-image prediction mode in which, in comparison to the inter-image prediction mode, one or both of the number of candidate block positions and the number of candidate reference images is reduced.

15. A data decoding apparatus having an inter-image prediction mode in which a block of one or more samples of a current image is predicted from a reference block of samples located at one of a number of candidate block positions in a reference image, the method comprising:

a controller configured to selectively apply a constrained inter-image prediction mode in which, in comparison to the inter-image prediction mode, one or both of the number of candidate block positions and the number of candidate reference images is reduced.

16. Video data capture, transmission, display and/or storage apparatus comprising apparatus according to clause 14 or clause 15.

17. An instance of distribution of encoded data which is partitioned into data portions, the encoded data comprising a flag indicating a constrained inter-image prediction mode in which, in comparison to the inter-image prediction mode, one or both of the number of candidate block positions and the number of candidate reference images is reduced.

As discussed earlier, it will be appreciated that apparatus features of the above clauses may be implemented by respective features of the encoder or decoder as discussed earlier.

The invention claimed is:

1. A method of encoding image data, comprising:
    encoding first portions of the image data to be included in a data stream by applying an inter-image prediction mode to the first portions of the image data, in which a first block of the image data is predicted from a first reference block located in a first reference image that is identified by a first motion vector in the inter-image prediction mode, the first motion vector being provided according to a first level of accuracy;
    encoding second portions of the image data to be included in the data stream by applying a constrained inter-image prediction mode to the second portions of the image data, in which a second block of the image data is predicted from a second reference block located in a second reference image that is identified by a second motion vector in the constrained inter-image prediction mode, the second motion vector being provided according to a second level of accuracy, and the second level of accuracy being a reduced accuracy of the first level of accuracy; and
    setting, in the data stream, a flag indicating the second portions of the image data to which the constrained inter-image prediction mode is applied.

2. The method according to claim 1, wherein
the first reference image is selected from a first number of candidate reference images in the inter-image prediction mode,
the second reference image is selected from a second number of candidate reference images in the constrained inter-image prediction mode, and
the second number of candidate reference images in the constrained inter-image prediction mode is constrained to be less than the first number of candidate reference images in the inter-image prediction mode.

3. The method according to claim 1, wherein
the first level of accuracy is quarter-sample accuracy; and
the second level of accuracy is half-sample accuracy or integer-sample accuracy.

4. The method according to claim 1, wherein the flag is included in sequence parameter set data in the data stream.

5. The method according to claim 1, wherein a search area in which the second reference block is located in the constrained inter-image prediction mode is constrained to be smaller than a search area in which the first reference block is located in the inter-image prediction mode.

6. The method according to claim 1, further comprising disabling interpolation filter circuitry in the constrained inter-image prediction mode.

7. The method according to claim 1, wherein the second number of candidate reference images in the constrained inter-image prediction mode is one.

8. The method according to claim 7, wherein the one candidate reference image in the constrained inter-image prediction mode is an immediately temporally preceding image.

9. A method of decoding image data, comprising:
    decoding, from a data stream, first portions of the image data by applying an inter-image prediction mode to the first portions of the image data, in which a first block of the image data is predicted from a first reference block located in a first reference image that is identified by a first motion vector in the inter-image prediction mode, the first motion vector being provided according to a first level of accuracy;
    obtaining, from the data stream, a flag indicating second portions of the image data to which a constrained inter-image prediction mode is applied; and
    decoding, from the data stream, the second portions of the image data as indicated by the flag by applying the constrained inter-image prediction mode to the second portions of the image data, in which a second block of the image data is predicted from a second reference block located in a second reference image that is identified by a second motion vector in the constrained inter-image prediction mode, the second motion vector being provided according to a second level of accuracy, and the second level of accuracy being a reduced accuracy of the first level of accuracy.

10. The method according to claim 9, wherein
the first reference image is selected from a first number of candidate reference images in the inter-image prediction mode,
the second reference image is selected from a second number of candidate reference images in the constrained inter-image prediction mode, and
the second number of candidate reference images in the constrained inter-image prediction mode is constrained to be less than the first number of candidate reference images in the inter-image prediction mode.

11. The method according to claim 9, wherein
the first level of accuracy is quarter-sample accuracy; and
the second level of accuracy is half-sample accuracy or integer-sample accuracy.

12. The method according to claim 9, wherein the flag is included in sequence parameter set data in the data stream.

13. The method according to claim 9, further comprising disabling interpolation filter circuitry in the constrained inter-image prediction mode.

14. The method according to claim 9, wherein the second number of candidate reference images in the constrained inter-image prediction mode is one.

15. An image decoding apparatus, comprising:
    processing circuitry configured to:
        decode, from a data stream, first portions of the image data by applying an inter-image prediction mode to the first portions of the image data, in which a first block of the image data is predicted from a first reference block located in a first reference image that is identified by a first motion vector in the inter-image prediction mode, the first motion vector being provided according to a first level of accuracy;

obtain, from the data stream, a flag indicating second portions of the image data to which a constrained inter-image prediction mode is applied; and decode, from the data stream, the second portions of the image data as indicated by the flag by applying the constrained inter-image prediction mode to the second portions of the image data, in which a second block of the image data is predicted from a second reference block located in a second reference image that is identified by a second motion vector in the constrained inter-image prediction mode, the second motion vector being provided according to a second level of accuracy, and the second level of accuracy being a reduced accuracy of the first level of accuracy.

16. The image decoding apparatus of claim 15, wherein the first reference image is selected from a first number of candidate reference images in the inter-image prediction mode, the second reference image is selected from a second number of candidate reference images in the constrained inter-image prediction mode, and the second number of candidate reference images in the constrained inter-image prediction mode is constrained to be less than the first number of candidate reference images in the inter-image prediction mode.

17. The image decoding apparatus of claim 15, wherein the processing circuitry is further configured to disable interpolation filter circuitry of the image decoding apparatus in the constrained inter-image prediction mode.

18. An image encoding apparatus, comprising:
processing circuitry configured to:
encode first portions of the image data to be included in a data stream by applying an inter-image prediction mode to the first portions of the image data, in which a first block of the image data is predicted from a first reference block located in a first reference image that is identified by a first motion vector in the inter-image prediction mode, the first motion vector being provided according to a first level of accuracy;

encode second portions of the image data to be included in the data stream by applying a constrained inter-image prediction mode to the second portions of the image data, in which a second block of the image data is predicted from a second reference block located in a second reference image that is identified by a second motion vector in the constrained inter-image prediction mode, the second motion vector being provided according to a second level of accuracy, and the second level of accuracy being a reduced accuracy of the first level of accuracy; and set, in the data stream, a flag indicating the second portions of the image data to which the constrained inter-image prediction mode is applied.

19. The image decoding apparatus of claim 15, wherein the first level of accuracy is quarter-sample accuracy; and the second level of accuracy is half-sample accuracy or integer-sample accuracy.

20. The image encoding apparatus of claim 18, wherein the first reference image is selected from a first number of candidate reference images in the inter-image prediction mode, the second reference image is selected from a second number of candidate reference images in the constrained inter-image prediction mode, and the second number of candidate reference images in the constrained inter-image prediction mode is constrained to be less than the first number of candidate reference images in the inter-image prediction mode.

21. The image encoding apparatus of claim 18, wherein the first level of accuracy is quarter-sample accuracy; and the second level of accuracy is half-sample accuracy or integer-sample accuracy.

* * * * *